United States Patent [19]

Hodges et al.

[11] Patent Number: 4,841,608
[45] Date of Patent: Jun. 27, 1989

[54] METHOD OF FORMING ELECTRICAL TERMINATION ON CAPACITOR TOPS

[75] Inventors: C. Wayne Hodges, Huntsville, Ala.; Dennis R. Henderson, Greenwood; Edwin R. Koons, Whiteland, both of Ind.

[73] Assignee: Aerovox M, Inc., Glasgow, Ky.

[21] Appl. No.: 4,321

[22] Filed: Jan. 16, 1987

[51] Int. Cl.⁴ .............................................. H01G 7/00
[52] U.S. Cl. .................................. 29/25.42; 29/884; 361/540; 174/52.3
[58] Field of Search ................. 29/884, 25.41, 25.42; 361/433 H, 433 T; 174/52 S

[56] References Cited

U.S. PATENT DOCUMENTS

| | | | |
|---|---|---|---|
| 3,398,333 | 8/1968 | Zeppieri | 174/52 S |
| 3,904,939 | 9/1975 | Carino | 174/52 S |
| 4,047,790 | 9/1977 | Carino | 174/52 S |
| 4,521,830 | 6/1985 | Aultman et al. | 361/433 H |

FOREIGN PATENT DOCUMENTS

| | | | |
|---|---|---|---|
| 114414 | 1/1942 | Australia | 361/433 T |
| 626413 | 10/1961 | Italy | 361/433 H |

Primary Examiner—P. W. Echols
Attorney, Agent, or Firm—Willian, Brinks, Olds, Hofer, Gilson & Lione, Ltd.

[57] ABSTRACT

Capacitor bodies are usually carried in open ended containers. The open ends are then closed with a cover or capacitor top after the capacitor body is inserted in the container. Electrical leads are then attached to terminals carried by the capacitor top. Prior art methods of forming such tops involved insert molding. The present invention starts with a preformed plastic disc with two apertures for terminals and a boss for positioning lead attachment. The terminals and a positioning lead are then applied to the disc through a combination of riveting and ultrasonic swaging.

20 Claims, 2 Drawing Sheets

METHOD OF FORMING ELECTRICAL TERMINATION ON CAPACITOR TOPS

BACKGROUND OF THE INVENTION

The present invention relates to tops or covers for capacitor containers and more particularly to a method of providing such tops along with a method of attaching electrical leads to the tops.

Capacitor bodies are carried in open mouthed containers the open end of which are closed by a cover. The cover also includes electrical leads for electrically connecting the capacitor body to a desired electrical circuit. Prior to the present invention, the tops and the inserts for holding the attendant electrical leads were manufactured by an insert molding process which is expensive and, to a certain degree, leads to inaccuracies. In addition, after the insert molding process, it was necessary to provide a secondary crimp to the inserts to deform them inside the top in order to insure a seal between the inserts and the top. This also adds to the manufacturing costs.

SUMMARY OF THE INVENTION

Accordingly, there is provided a method of manufacturing tops for capacitor containers which is less costly than prior art methods, more accurate and in addition provides greater flexibility in the choice of methods of attaching the electrical leads to the top. Generally speaking the method comprises injection molding a plastic disc having at least two apertures therein and a boss extending therefrom, force fitting a metal insert in each of the two apertures to form a seal between the disc and the inserts, attaching an electrical lead to each of the metal inserts, and connecting a positioning lead in the boss.

DESCRIPTION OF THE INVENTION

Figure 1:
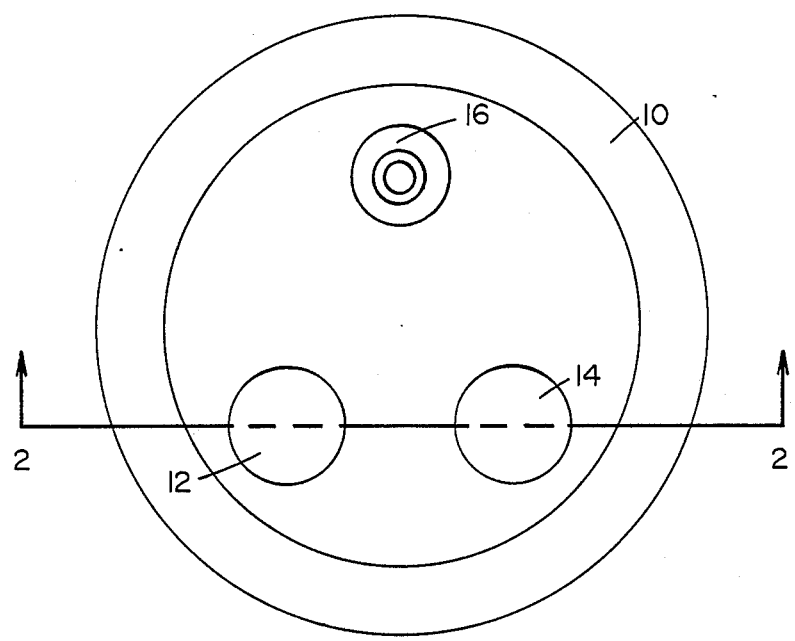
FIG. 1 is a top view of the disc formed according to the invention.
Figure 2:
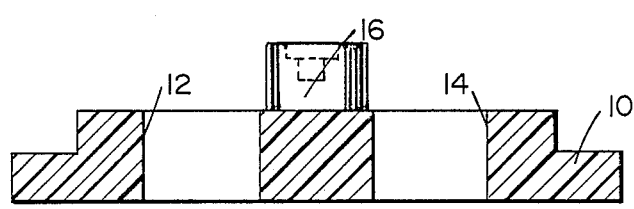
FIG. 2 is a view taken along the line 2—2 of FIG. 1.

Referring to FIGS. 1 and 2, there is shown a plastic disc 10 having a pair of apertures 12 and 14 and a boss 16. The disc with the apertures and the boss is formed through a suitable injection molding process. The disc as well as the boss are preferably fabricated of a thermoplastic such as nylon.

Figure 3:
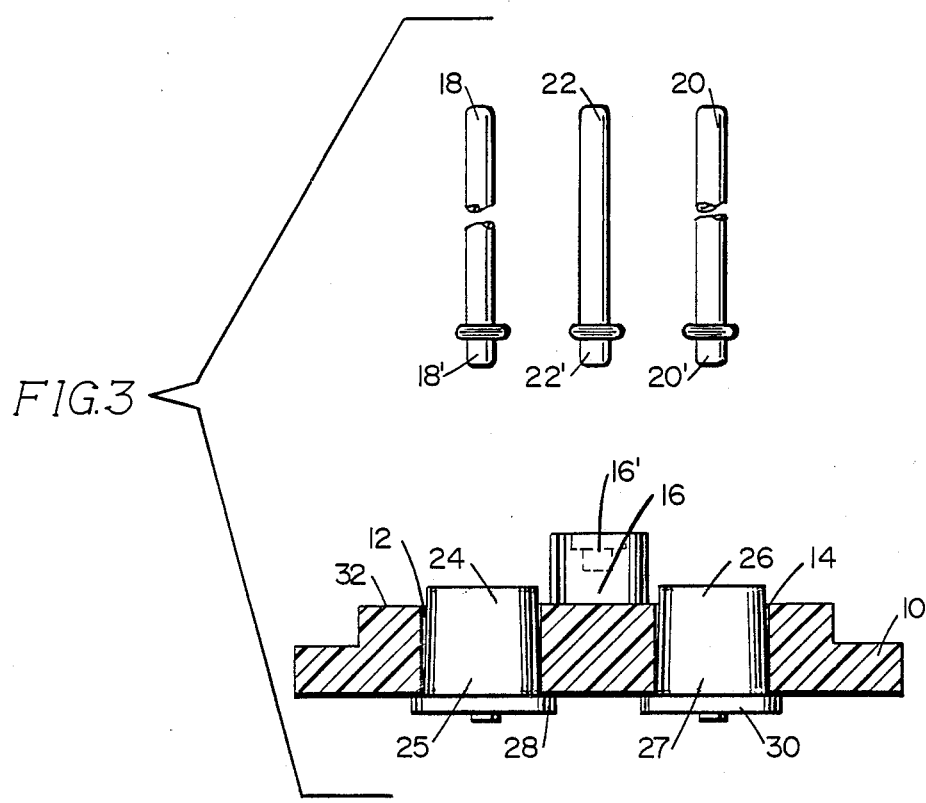
FIG. 3 is a view similar to FIG. 2 showing the relationship of the disc to various elements carried by the disc.
Figure 4:
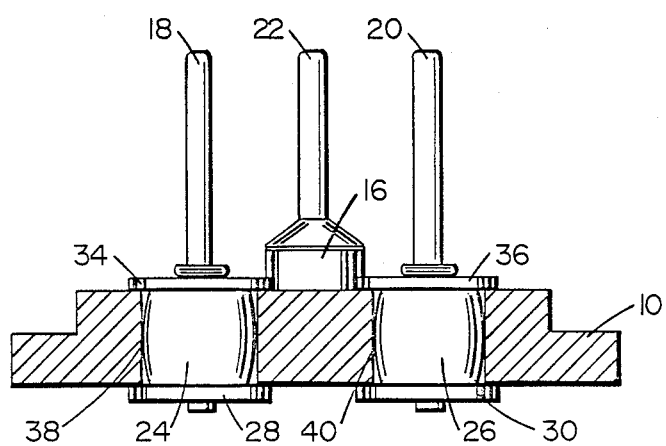
FIG. 4 is a view similar to FIG. 3 with all of the elements assembled.

Referring to FIGS. 3 and 4, the method for assembling electrical leads 18 and 20 and a positioning lead 22 is shown. First, metal inserts 24 and 26 are force fitted under pressure into apertures 12 and 14. As shown, the inserts are in the form of rivets having body portions 25 and 27 and heads 28 and 30. The body portions are tapered so as to have a larger diameter at the head end so as to provide an interference fit with the walls of the apertures. The rivets extend beyond the surface 32 of the disc so that they can, as shown in FIG. 4, be deformed to form rivet heads 34 and 36. They may be deformed through orbital or upset riveting, for example. During deformation to form heads 34 and 36, the body portions 25 and 27 are forced to bulge (FIG. 4, 38 and 40) to form a good seal between the inserts and the disc 10.

Electrical leads 18 and 20 are now attached to heads 34 and 36 of inserts 24 and 26. This may be done by resistance welding, for example, by welding tips 18' and 20' to the rivet heads. Positioning lead 22 is attached to boss 16 by inserting its tip 22' into recess 16' of boss 16 and then ultrasonically swaging the boss around the lead tip.

What is claimed is:

1. A method of providing electrical leads in a capacitor top, said method comprising:
   providing a plastic disc having at least two apertures therein and having a boss extending therefrom,
   force fitting a metal insert in each of said two apertures to form a seal between said disc and said two inserts,
   attaching an electrical lead to each of said metal inserts, and
   attaching a positioning lead to said boss.

2. A method according to claim 1 wherein said positioning lead is ultrasonically swaged in said boss.

3. A method according to claim 1 wherein said plastic disc is a thermosetting plastic.

4. A method according to claim 1 wherein said plastic disc is formed by injection molding.

5. A method according to claim 1 wherein said electrical leads are resistance welded to said inserts.

6. A method according to claim 1 wherein said inserts are rivets having body portions and first heads at ends thereof and wherein second heads are formed at opposite ends of said body portions after insertion of said inserts into said apertures.

7. A method according to claim 6 wherein bulges are formed in said body portions during formation of said second heads.

8. A method according to claim 6 wherein said second heads are formed through orbital riveting.

9. A method according to claim 6 wherein said second heads are formed through upset riveting.

10. A method according to claim 1 wherein said disc is thermoplastic.

11. A method for providing a capacitor top, said method comprising the steps of
    providing a plastic member having therein two apertures and having extending therefrom a boss,
    force fitting respective metal inserts into said apertures to form a seal between said member and said inserts,
    attaching respective electrical leads to said inserts, and
    attaching a positioning lead to said boss.

12. A method as set forth in claim 11 wherein said member is made of thermosetting plastic.

13. A method as set forth in claim 11 wherein said member is thermoplastic.

14. A method as set forth in claim 11 wherein said positioning lead is ultrasonically swaged in said boss.

15. A method as set forth in claim 11 wherein said electrical leads are resistance welded to said inserts.

16. A method as set forth in claim 11 wherein said inserts are rivets having respective body portions and first heads, and wherein said method further comprises the step of forming second heads at opposite ends of said body portions after insertion of said inserts into said apertures.

17. A method as set forth in claim 16 and further comprising the step of forming bulges in said body portions during formation of said second heads.

18. A method for providing a capacitor top, said method comprising the steps of injection molding a plastic disc having therein first and second apertures and having extending therefrom a boss, providing first and second metal rivets, each of said rivets including a body portion, opposite first and second ends, and a first head at said first end, force fitting said first and second rivets into said first and second apertures, respectively, to form a seal between said disc and said rivets, forming second heads at said second ends of said body portions after force fitting said rivets into said apertures, forming bulges in said body portions during formation of said second heads, resistance welding first and second electrical leads to said first and second rivets, respectively, and ultrasonically swaging a positioning lead in said boss.

19. A method as set forth in claim 18 wherein said disc is made of thermosetting plastic.

20. A method as set forth in claim 18 wherein said disc is thermoplastic.

* * * * *